United States Patent
Batenburg et al.

(10) Patent No.: US 10,385,890 B2
(45) Date of Patent: Aug. 20, 2019

(54) DETECTING END OF STROKE IN A HYDRAULIC MOTOR

(71) Applicant: WESTPORT POWER INC., Vancouver (CA)

(72) Inventors: Gregory A. Batenburg, Delta (CA); Anuja S. Bengali, Surrey (CA)

(73) Assignee: WESTPORT POWER INC., Vancouver (CA)

(*) Notice: Subject to any disclaimer, the term of this patent is extended or adjusted under 35 U.S.C. 154(b) by 0 days.

(21) Appl. No.: 15/037,567

(22) PCT Filed: Nov. 5, 2014

(86) PCT No.: PCT/CA2014/051063
§ 371 (c)(1),
(2) Date: May 18, 2016

(87) PCT Pub. No.: WO2015/074142
PCT Pub. Date: May 28, 2015

(65) Prior Publication Data
US 2016/0298659 A1    Oct. 13, 2016

(30) Foreign Application Priority Data

Nov. 21, 2013  (CA) ..................................... 2833663

(51) Int. Cl.
*F15B 15/28*    (2006.01)
*F04B 9/105*    (2006.01)
(Continued)

(52) U.S. Cl.
CPC .......... *F15B 15/2815* (2013.01); *F01B 31/26* (2013.01); *F04B 9/105* (2013.01);
(Continued)

(58) Field of Classification Search
None
See application file for complete search history.

(56) References Cited

U.S. PATENT DOCUMENTS 3,970,034 A * 7/1976 Kirk ..................... F15B 15/2838
116/266
4,478,129 A * 10/1984 Hannes ............... F15B 15/2838
91/1
(Continued)

FOREIGN PATENT DOCUMENTS

CA    1 247 984 A    1/1989
CA    2 602 164 A    12/2007
(Continued)

OTHER PUBLICATIONS

Chinese First Office Action, dated Jul. 4, 2017, for Chinese Application No. 201480063649.6, 9 pages. (with English Translation).
(Continued)

*Primary Examiner* — Jill E Culler
(74) *Attorney, Agent, or Firm* — Seed IP Law Group LLP

(57) ABSTRACT

It is challenging to detect end of stroke for hydraulically actuated, reciprocating piston pumps for a variety of reasons. When the pump pressurizes a process fluid to a 10 relatively low pressure the magnitude of hydraulic fluid pressure is not as distinct compared to the magnitude of a pressure drop across a shuttle valve employed to detect end of stroke, which makes detecting the end of stroke event difficult. A method is disclosed for detecting end of a piston stroke in a hydraulic motor comprising a reciprocating piston with a shuttle valve. The method comprises 1 detecting end of piston stroke when a magnitude of a rate of change of hydraulic fluid pressure is substantially greater than a magnitude of a mean rate of change of hydraulic fluid
(Continued)

pressure over said piston stroke; and noise in a hydraulic fluid pressure signal is substantially negligible.

9 Claims, 4 Drawing Sheets

(51) Int. Cl.
F04B 49/06 (2006.01)
F04B 51/00 (2006.01)
F01B 31/26 (2006.01)
F04B 15/08 (2006.01)

(52) U.S. Cl.
CPC ............ *F04B 49/065* (2013.01); *F04B 51/00* (2013.01); *F15B 15/2838* (2013.01); *F04B 2015/081* (2013.01); *F15B 2211/6309* (2013.01); *F15B 2211/6653* (2013.01); *F15B 2211/8616* (2013.01)

(56) References Cited

U.S. PATENT DOCUMENTS

| | | | |
|---|---|---|---|
| 4,729,283 A | 3/1988 | Hillier | |
| 4,843,951 A * | 7/1989 | Bruggen | F15B 15/26 |
| | | | 251/129.06 |
| 6,050,092 A * | 4/2000 | Genstler | F02G 1/0435 |
| | | | 60/520 |
| 7,059,238 B2 * | 6/2006 | Albright | F15B 15/1433 |
| | | | 92/5 R |
| 7,075,292 B2 | 7/2006 | Berchowitz et al. | |
| 7,380,528 B2 | 6/2008 | Gaessler et al. | |
| 7,739,941 B2 | 6/2010 | Noble et al. | |
| 2001/0037689 A1 * | 11/2001 | Krouth | F15B 15/2838 |
| | | | 73/861.52 |
| 2003/0079603 A1 | 5/2003 | Schumacher et al. | |
| 2006/0119350 A1 | 6/2006 | Berchowitz et al. | |
| 2006/0241846 A1 | 10/2006 | Gaessler et al. | |

FOREIGN PATENT DOCUMENTS

| | | |
|---|---|---|
| CN | 101044327 A | 9/2007 |
| JP | 2000-170713 A | 6/2000 |

OTHER PUBLICATIONS

Chinese Search Report, dated Jul. 4, 2017, for Chinese Application No. 2014800636496, 4 pages. (with English Translation).
Extended European Search Report, dated Jun. 1, 2017, for European Application No. 14863219.3-1616 / 3071843, 10 pages.
International Search Report and Written Opinion, dated Jan. 22, 2015, for PCT/CA2014/051063, 7 pages.
Chinese Office Action, dated Mar. 5, 2018, for Chinese Application No. 201480063649.6, 8 pages (with English translation).
Chinese Search Report, dated Feb. 24, 2018, for Chinese Application No. 201480063649.6, 3 pages (with English translation).

* cited by examiner

DETECTING END OF STROKE IN A HYDRAULIC MOTOR

FIELD OF THE INVENTION

The present application relates to a method of detecting end of stroke in a reciprocating piston hydraulic motor. A particularly suitable application for this method is detecting the end of stroke for a piston in a hydraulic drive cylinder associated with of a cryogenic pump that pressurizes a gaseous fuel for an internal combustion engine.

BACKGROUND OF THE INVENTION

The Applicant's co-owned U.S. Pat. No. 7,739,941, issued Jun. 22, 2010, discloses a hydraulic drive system for a reciprocating piston pump and a method of effectively controlling the reversal of piston movement at the end of each piston stroke, without the use of position sensors, flow rate sensors or special flow-sensing valves. A shuttle valve arranged in the piston of the hydraulic drive section is activated to open as the piston approaches either end of the hydraulic cylinder head. A pressure drop occurs on the high pressure side of the hydraulic circuit due to the opening of the shuttle valve. A pressure sensor is employed to detect this pressure drop such that the flow of hydraulic fluid can be switched to reverse the movement of the hydraulic piston.

In one application the reciprocating piston pump is a cryogenic pump that pumps gaseous fuel to a high pressure for delivery to an internal combustion engine. The gaseous fuel is pumped through a vaporizer where it undergoes a transition from the liquid to either the supercritical or gas states, and is sufficiently pressurized such that it overcomes in-cylinder pressure when it is directly introduced into combustion chambers of the engine. These applications are referred to as high pressure systems.

In other applications, gaseous fuel is introduced to combustion chambers of an engine by injecting it upstream of intake valves that regulate flow of air to the combustion chambers. In comparison to the described high pressure systems, these applications can be referred to as low pressure systems, referring to the pressure at which the gaseous fuel is delivered to the engine. Fuel injectors inject the gaseous fuel into the intake manifold, where the pressure is substantially less than the in-cylinder pressure during direction injection for the high pressure application discussed above.

The method of detecting the end of stroke for the hydraulic piston in the cryogenic pump, by detecting the pressure drop due to the opening of the shuttle valve, is more challenging in a low pressure system compared to a high pressure system. The relative magnitude of pressure fluctuations caused by shuttle valve switching, and the subsequent pressure drop, is not as distinct compared to the magnitude of hydraulic fluid pressure during compression strokes while pumping gaseous fuel.

FIG. 1 illustrates a trace of hydraulic fluid pressure for a compression stroke and a suction stroke of a reciprocating piston cryogenic pump where the hydraulic fluid is employed to drive a hydraulic piston. Cryogenic fluid is drawn into a pumping cylinder during the suction stroke, and compressed during the compression stroke. Rising edge 10 is the hydraulic fluid pressure during the compression stroke. As the gaseous fuel is compressed the hydraulic fluid pressure increases. Falling edge 20 occurs when the shuttle valve opens as the hydraulic piston reaches the end of compression stroke. The subsequent rising edge 30 represents the pressure drop across the shuttle valve. Flat edge 40 is the hydraulic fluid pressure during the suction stroke where the fluid pressure exerted on the hydraulic piston is substantially constant while cryogenic fluid is drawn into the pumping cylinder. Rising edge 50 occurs when the shuttle valve opens as the hydraulic piston reaches the end of suction stroke. Similar to rising edge 30, rising edge 50 represents the pressure drop across the shuttle valve. As can be seen by the relative magnitudes of the rising and falling edges, the magnitude of hydraulic fluid pressure during compression strokes is comparable to the pressure drop across the shuttle valve during switching events, which makes the distinction between these events more challenging.

The state of the art is lacking in techniques for improving the detection of end of piston stroke in a reciprocating piston hydraulic motor. The present method and apparatus provide a technique for improving the detection of end of piston stroke in a reciprocating piston hydraulic motor that can be employed in both low pressure systems and high pressure systems.

SUMMARY OF THE INVENTION

An improved method is disclosed for detecting end of a piston stroke in a hydraulic motor comprising a reciprocating piston with a shuttle valve comprises detecting end of piston stroke when a magnitude of a rate of change of hydraulic fluid pressure is substantially greater than a magnitude of a mean rate of change of hydraulic fluid pressure over the piston stroke; and noise in a hydraulic fluid pressure signal is substantially negligible. The method can further determine that a predetermined percentage of the piston stroke has occurred. This can improve detection accuracy and reduce the amount of processing required to detect the end of piston stroke.

An improved method for detecting end of a stroke in a hydraulically actuated, reciprocating piston pump comprising a shuttle valve comprises determining whether a compression stroke or a suction stroke is being performed; and detecting end of stroke when, for a compression stroke, a rate of change of hydraulic fluid pressure is substantially less than a mean rate of change of hydraulic fluid pressure over the compression stroke; for a suction stroke, a rate of change of hydraulic fluid pressure is substantially greater than a mean rate of change of hydraulic fluid pressure over the suction stroke; and noise in a hydraulic fluid pressure signal is substantially negligible. The method can further determine whether a predetermined percentage of the compression stroke and the suction has occurred.

An improved apparatus for detecting end of a piston stroke in a hydraulic motor comprising a reciprocating piston with a shuttle valve is provided. The apparatus comprises a hydraulic fluid pressure sensor and a controller programmed to receive signals from the hydraulic fluid pressure sensor representative of hydraulic fluid pressure. The controller is programmed to detect end of piston stroke when a magnitude of a rate of change of hydraulic fluid pressure is substantially greater than a magnitude of a mean rate of change of hydraulic fluid pressure over the piston stroke; and noise in a hydraulic fluid pressure signal is substantially negligible. The controller can be further programmed to determine that a predetermined percentage of the piston stroke has occurred.

DETAILED DESCRIPTION OF PREFERRED EMBODIMENT(S)

Figure 2:
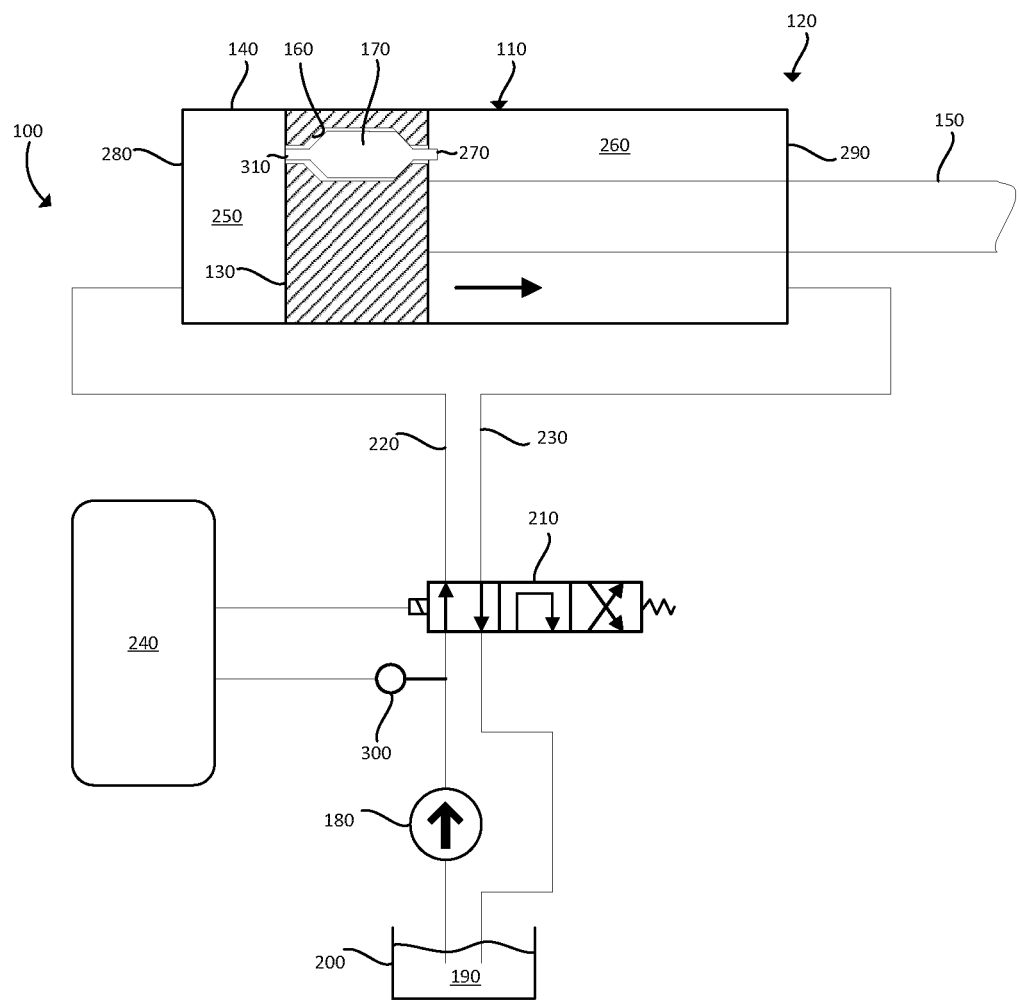
FIG. 2 is a schematic view of hydraulic system for a hydraulically driven, reciprocating piston pump according to one embodiment.

Referring to FIG. 2, there is shown hydraulic system 100 for actuating hydraulic motor 110 in a reciprocating piston pump driven by drive shaft 150. Hydraulic motor 110 comprises hydraulic piston 130 which is disposed within hydraulic cylinder 140. Hydraulic piston 130 comprises a cavity 160 into which shuttle valve 170 is arranged for controlling the flow of hydraulic fluid across the piston within hydraulic cylinder 140. Hydraulic pump 180 circulates hydraulic fluid 190 from hydraulic reservoir 200 through flow switching device 210 and piping 220 and 230 into hydraulic motor 110. Flow switching device 210 is commanded by controller 240 to switch the flow of hydraulic fluid into and out of piping 220 and 230 such that hydraulic fluid flow is switched between entering hydraulic cylinder 140 on either side of hydraulic piston 130, as will be described in more detail below. Pressure sensor 300 sends signals representative of hydraulic fluid pressure downstream from pump 180 to controller 240.

The operation of hydraulic system 100 is now described. Hydraulic fluid flows from hydraulic pump 180 into piping 220 and chamber 250 of hydraulic cylinder 140 causing hydraulic piston 130 and drive shaft 150 to move towards the right. Shuttle valve 170 closes due to pressure from hydraulic fluid preventing hydraulic fluid flow across hydraulic piston 130. When end 270 contacts cylinder head 290, shuttle valve 170 is forced open allowing hydraulic fluid to flow into chamber 260 across hydraulic piston 170, and out of hydraulic cylinder 140 into piping 230 to return to reservoir 200. Controller 240 is programmed to detect the pressure drop in hydraulic fluid pressure downstream from hydraulic pump 180 by processing signals received from pressure sensor 300, and commands flow switching device 210 to switch the flow of hydraulic fluid into and out of piping 220 and 230 such that hydraulic fluid from hydraulic pump 180 is made to flow into chamber 260. This causes shuttle valve 170 to move towards the left and abut the opposite inner wall of cavity 160 whereby piston 130 reverses direction and is made to move towards cylinder head 280. Similarly, when end 310 contacts cylinder head 280 shuttle valve 170 opens allowing hydraulic fluid to flow across piston 130. For a more detailed description of the operation of a similar hydraulic system see Applicant's U.S. Pat. No. 7,739,941.

Figure 1:
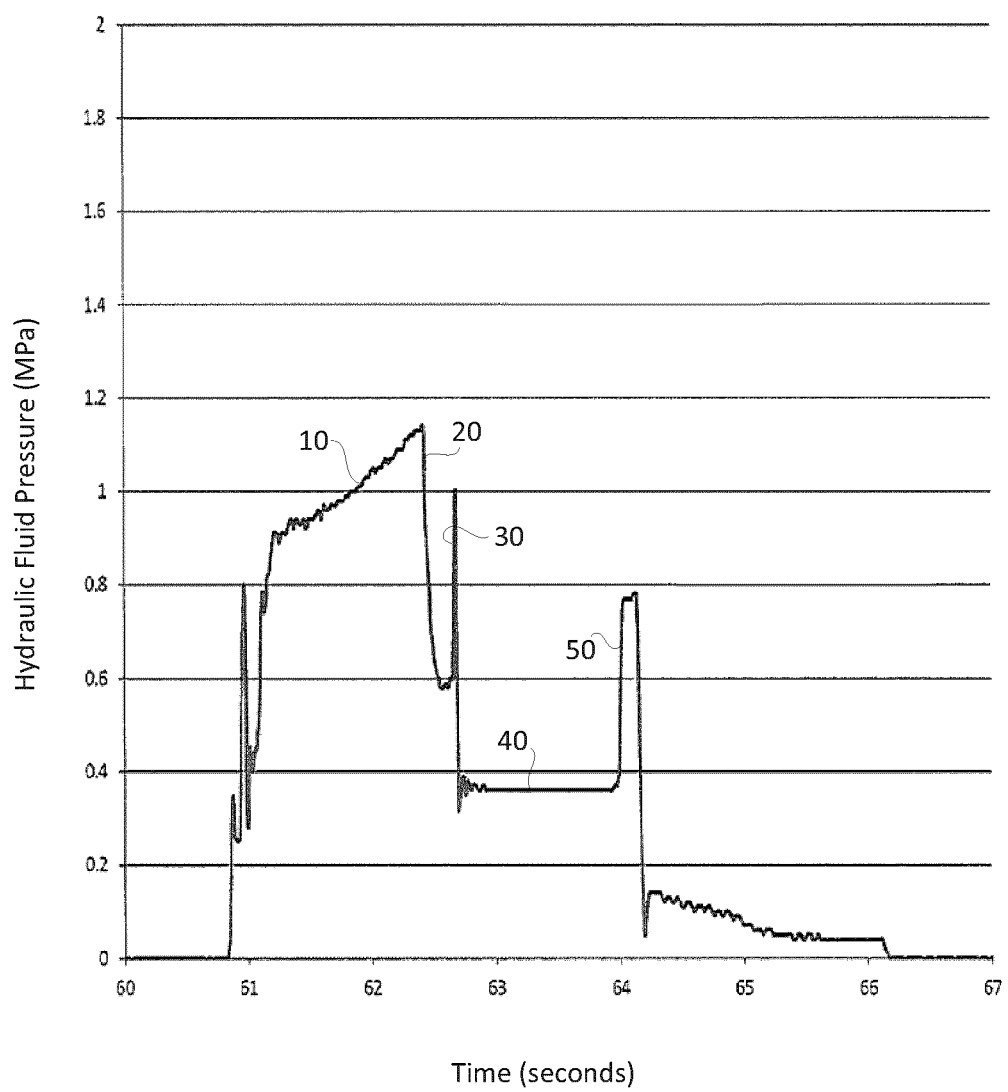
FIG. 1 is a plot view of hydraulic fluid pressure in a hydraulically driven, reciprocating piston pump for a compression stroke and a suction stroke of the pump.
Figure 3:
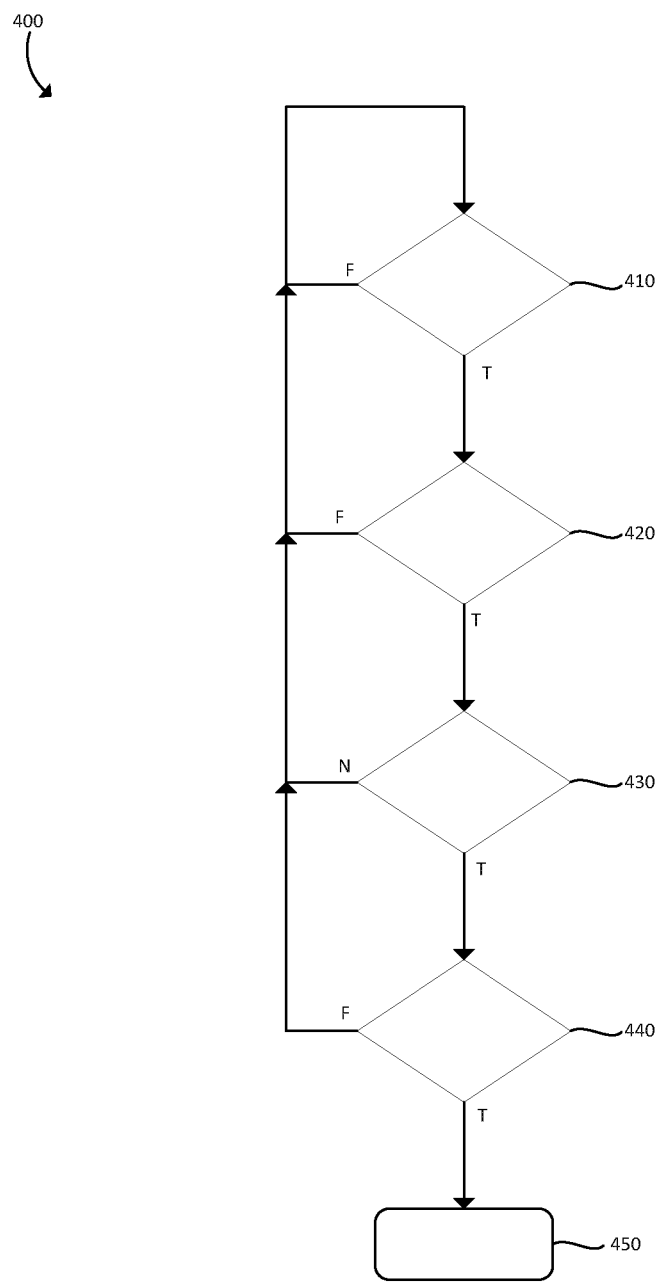
FIG. 3 is a technique of detecting end of stroke for the hydraulically driven, reciprocating piston pump of FIG. 2 during a compression stroke according to a first embodiment.

Referring now to FIG. 3 a technique of processing pressure signals controller 240 receives from pressure sensor 300 is now discussed according to a first embodiment. Algorithm 400 is employed to detect falling edge 20 (seen in FIG. 1) at the end of a compression stroke of hydraulically actuated, reciprocating piston pump 120 (seen in FIG. 2). Steps 410, 420, 430 and 440 in algorithm 400 are represented in sequential order however this is not a requirement. Steps 410 to 440 can occur in parallel and the only requirement is that each one of the conditions represented by these steps is true.

Step 410 determines whether equation 1a is true. Equation 1a requires that the rate of change of hydraulic fluid pressure (represented by the left hand side of equation 1a) is less than the mean rate of change of hydraulic fluid pressure from earlier in the compression stroke (represented by the right hand side of equation 1a). The term 'offset' represents a rate of hydraulic fluid pressure change limit value. In a preferred embodiment the rate of change of hydraulic fluid pressure is substantially less than the mean rate of change of hydraulic fluid pressure. During the compression stroke the rate of change of hydraulic fluid pressure is positive (seen as rising edge 10 in FIG. 1), and when the shuttle valve opens the rate of change of hydraulic fluid pressure is negative (seen as falling edge 20 in FIG. 1). The magnitude of the rate of change of hydraulic fluid pressure during rising edge 10 is less than the magnitude of the rate of change of hydraulic fluid pressure during falling edge 20. Equation 1a applies when the signs of the rates of change of the instantaneous and mean hydraulic fluid pressure are examined. Similarly, equation 1b applies when the relative magnitudes are compared. That is step 410 can determine whether either equation 1a or equation 1b is true. If step 410 is true the algorithm proceeds to step 420.

$$\frac{dP}{dt} < \left[ \text{mean}\left(\frac{dP}{dt}\right) - \text{offset} \right] \quad \text{Equation 1a}$$

$$\left|\frac{dP}{dt}\right| > \left[\left|\text{mean}\left(\frac{dP}{dt}\right)\right| - \text{offset}\right] \quad \text{Equation 1b}$$

Step 420 determines whether equation 2 is true. Equation 2 requires that the amount of noise in the hydraulic fluid pressure signal is substantially negligible (insignificant). The term $$\sigma\left(\frac{dP}{dt}\right)$$

represents the standard deviation of the rate of change of hydraulic fluid pressure. The term 'x' is a programmable parameter representing a predetermined number of deviations. The term 'offset' has the same meaning as in step 410, the rate of hydraulic fluid pressure change limit value. If step 420 is true the algorithm proceeds to step 430.

$$\left(x \times \sigma\left(\frac{dP}{dt}\right)\right) < \text{offset} \quad \text{Equation 2}$$

Step 430 determines that a compression stroke is currently being commanded by controller 240, and if it is, control passes to step 440. It is determined in step 440 whether a predetermined percentage of the compression stroke has occurred. Controller 240 can determine within a range of accuracy how far piston 130 has moved from cylinder head 280 towards cylinder head 290 during the compression stroke based on any one of several functions employing different combination of parameters. For example, the controller can determine what percentage of the compression stroke has occurred as a function of hydraulic fluid flow rate from hydraulic pump 180 and the cross-sectional area of hydraulic cylinder 140, or as a function of hydraulic fluid pressure, time, and the cross-sectional area of the hydraulic cylinder. If the predetermined percentage of the compression stroke has occurred, then step 440 is true. When the results of steps 410, 420, 430 and 440 are each true then the end of the compression stroke has been detected, represented by box 450.

Figure 4:
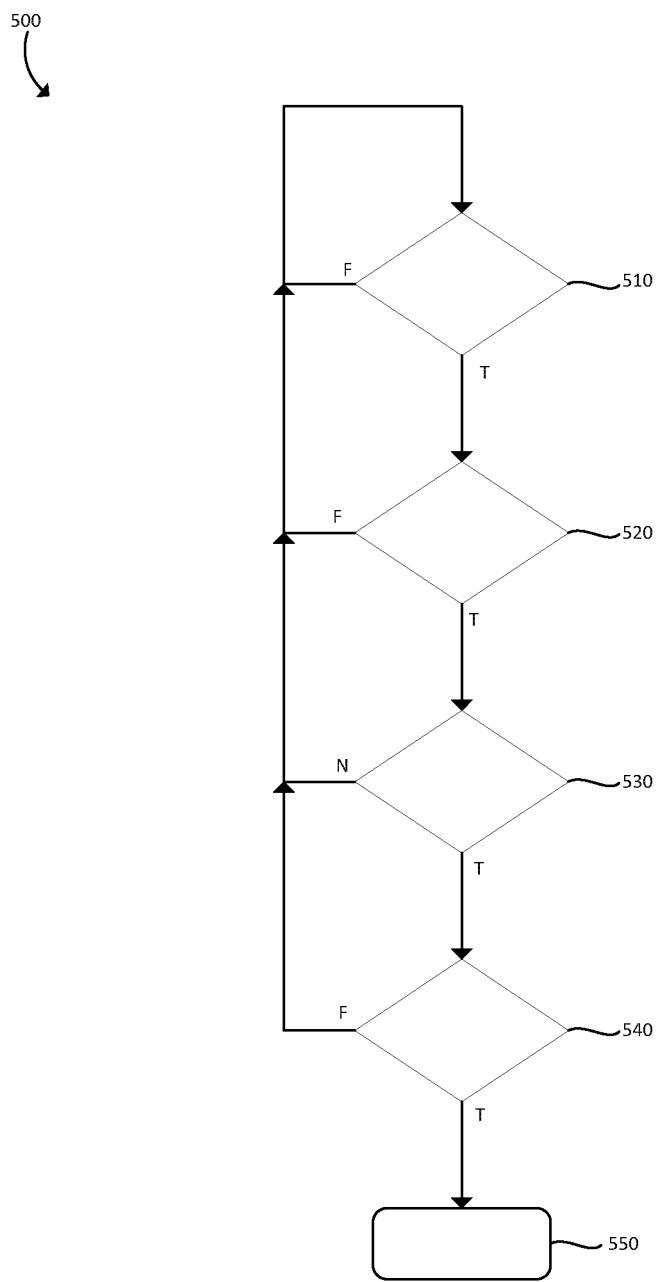
FIG. 4 is a technique of detecting end of stroke for the hydraulically driven, reciprocating piston pump of FIG. 2 during a suction stroke according to a second embodiment.

Referring now to FIG. 4 a technique of processing pressure signals controller 240 receives from pressure sensor 300 is now discussed according to a second embodiment. Algorithm 500 is employed to detect rising edge 50 (seen in FIG. 1) at the end of a suction stroke (seen as flat edge 40 in FIG. 1) of hydraulically actuated, reciprocating piston pump 120 (seen in FIG. 2). Steps 510, 520, 530 and 540 in algorithm 500 are represented in sequential order, however, this is not a requirement. Steps 510 to 540 can occur in parallel and the only requirement is that each one of the conditions represented by these steps is true.

Step 510 determines whether equation 3 is true. Equation 3a requires that the rate of change of hydraulic fluid pressure (represented by the left hand side of equation 1) is greater than the mean rate of change of hydraulic fluid pressure from earlier in the suction stroke (represented by the right hand side of equation 3a). The term 'offset' represents a rate of hydraulic fluid pressure change limit value. In a preferred embodiment the rate of change of hydraulic fluid pressure is substantially greater than the mean rate of change of hydraulic fluid pressure. During the suction stroke the rate of change of hydraulic fluid pressure is approximately zero (seen as flat edge 40 in FIG. 1), and when the shuttle valve opens the rate of change of hydraulic fluid pressure is positive (seen as rising edge 50 in FIG. 1). The magnitude of the rate of change of hydraulic fluid pressure during flat edge 40 is less than the magnitude of the rate of change of hydraulic fluid pressure during rising edge 50. Equation 3a applies when the signs of the rates of change of the instantaneous and mean hydraulic fluid pressure are examined. Similarly, equation 3b applies when the relative magnitudes are compared. If step 510 is true the algorithm proceeds to step 520.

$$\frac{dP}{dt} > \left[ \text{mean}\left(\frac{dP}{dt}\right) + \text{offset} \right] \quad \text{Equation 3a}$$

$$\left|\frac{dP}{dt}\right| > \left[\left|\text{mean}\left(\frac{dP}{dt}\right)\right| + \text{offset}\right] \quad \text{Equation 3b}$$

Step 520 determines whether equation 4 is true. Equation 4 requires that the amount of noise in the hydraulic fluid pressure signal is substantially negligible (insignificant). The term $$\sigma\left(\frac{dP}{dt}\right)$$

represents the standard deviation of the rate of change of hydraulic fluid pressure. The term 'x' is a programmable parameter representing a predetermined number of deviations. The term 'offset' has the same meaning as in step 510, the rate of hydraulic fluid pressure change limit value. That is, step 510 can determine whether either equation 3a or equation 3b is true. If step 520 is true, the algorithm proceeds to step 530.

$$\left(x \times \sigma\left(\frac{dP}{dt}\right)\right) < \text{offset} \quad \text{Equation 4}$$

Step 530 determines that a suction stroke is currently being commanded by controller 240, and if it is, control passes to step 540. It is determined in step 540 whether a predetermined percentage of the suction stroke has occurred. Controller 240 can determine within a range of accuracy how far piston 130 has moved from cylinder head 290 towards cylinder head 280 during the suction stroke based on any one of several functions of different combination of parameters. For example, the controller can determine what percentage of the compression stroke occurred as a function of hydraulic fluid flow from hydraulic pump 180 and the cross-sectional area of hydraulic cylinder 140, or as a function of hydraulic fluid pressure, time, and the cross-sectional area of the hydraulic cylinder. If the predetermined percentage of the suction stroke has occurred, then step 540 is true. When the results of steps 510, 520, 530 and 540 are each true then the end of the suction stroke has been detected, represented by box 550.

Accurate detection of end of compression and suctions strokes improves the overall efficiency of hydraulically actuated, reciprocating piston pumps. Fully completed compression strokes result in the highest possible pump efficiency. Reduction of wasted time at the end of each stroke increases the potential reciprocation rate of the hydraulically actuated, reciprocation piston pump. This technique improves the detection of end of strokes compared to previous techniques by up to approximately 10% by reduction in inherent delays that existed at the end of suctions strokes due to the margin required by a virtual position sensor. This increases the delivery capacity of the hydraulically actuated, reciprocating piston pumps by up to approximately 10%. This technique accurately and repeatably detects end of compression and suction strokes in low pressure systems, unlike prior art techniques.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A method for detecting end of a piston stroke in a hydraulic motor comprising a reciprocating piston with a shuttle valve, the method comprising:
    determining a magnitude of a rate of change of hydraulic fluid pressure;
    determining a magnitude of a mean rate of change of hydraulic fluid pressure over said piston stroke;
    detecting end of piston stroke when: the determined magnitude of a rate of change of hydraulic fluid pressure is substantially greater than the determined magnitude of a mean rate of change of hydraulic fluid pressure over said piston stroke and noise in a hydraulic fluid pressure signal is substantially negligible; and
    switching the flow of hydraulic fluid through the hydraulic motor when end of piston stroke is detected.

2. The method of claim 1, further comprising determining that a predetermined percentage of said piston stroke has occurred.

3. The method of claim 1, wherein the determining a rate of change of hydraulic fluid pressure includes determining a rate of change of hydraulic pressure upstream of a hydraulic pump and downstream of the hydraulic motor.

4. A method for detecting end of a stroke in a hydraulically actuated, reciprocating piston pump comprising a shuttle valve, the method comprising:
   determining whether a compression stroke or a suction stroke is being performed;
   for a compression stroke:
      determining a rate of change of hydraulic fluid pressure;
      determining a mean rate of change of hydraulic fluid pressure over said compression stroke;
      detecting end of stroke when: for a compression stroke, the determined rate of change of hydraulic fluid pressure is substantially less than the determined mean rate of change of hydraulic fluid pressure over said compression stroke and noise in a hydraulic fluid pressure signal is substantially negligible;
   for a suction stroke:
      determining a rate of change of hydraulic fluid pressure;
      determining a mean rate of change of hydraulic fluid over said suction stroke;
      detecting end of stroke when: for a suction stroke, the determined rate of change of hydraulic fluid pressure is substantially greater than the determined mean rate of change of hydraulic fluid pressure over said suction stroke and noise in a hydraulic fluid pressure signal is substantially negligible; and
      switching the flow of hydraulic fluid through the hydraulic motor when end of piston stroke is detected.

5. The method of claim 4, further comprising determining whether a predetermined percentage of said compression stroke and said suction has occurred.

6. The method of claim 4, wherein the determining a rate of change of hydraulic fluid pressure for the compression stroke or the suction stroke includes determining a rate of change of hydraulic pressure upstream of a hydraulic pump and downstream of the hydraulic motor.

7. An apparatus for detecting end of a piston stroke in a hydraulic motor comprising a reciprocating piston with a shuttle valve, the apparatus comprising:
   a hydraulic fluid pressure sensor;
   a flow switching device controlling the direction of the flow of hydraulic fluid through the hydraulic motor;
   a controller programmed to:
      receive signals from said hydraulic fluid pressure sensor representative of hydraulic fluid pressure;
      determine a magnitude of a rate of change of hydraulic fluid pressure;
      determine a magnitude of a mean rate of change of hydraulic fluid pressure over said piston stroke;
      detect end of piston stroke when: the determined magnitude of a rate of change of hydraulic fluid pressure is substantially greater than the determined magnitude of a mean rate of change of hydraulic fluid pressure over said piston stroke and noise in a hydraulic fluid pressure signal is substantially negligible; and
      command the flow switching device to switch the flow of hydraulic fluid through the hydraulic motor when end of piston stroke is detected.

8. The apparatus of claim 7, wherein said controller is further programmed to determine that a predetermined percentage of said piston stroke has occurred.

9. The apparatus of claim 7, wherein the determine a rate of change of hydraulic fluid pressure includes determining a rate of change of hydraulic pressure upstream of a hydraulic pump and downstream of the hydraulic motor.

* * * * *